United States Patent
Kim et al.

(10) Patent No.: US 9,207,479 B2
(45) Date of Patent: Dec. 8, 2015

(54) DISPLAY PANEL

(71) Applicant: Samsung Display Co., Ltd., Yongin, Gyeonggi-Do (KR)

(72) Inventors: Won Ho Kim, Seongnam-si (KR); Tae Hyung Hwang, Seoul (KR); Youngjin Park, Suwon-si (KR); Seongsu Lim, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 14/195,328

(22) Filed: Mar. 3, 2014

(65) Prior Publication Data

US 2015/0055073 A1  Feb. 26, 2015

(30) Foreign Application Priority Data

Aug. 20, 2013  (KR) .......... 10-2013-0098721

(51) Int. Cl.
| | |
|---|---|
| *C09K 19/00* | (2006.01) |
| *G02F 1/1333* | (2006.01) |
| *G02F 1/1343* | (2006.01) |
| *G02F 1/1362* | (2006.01) |

(52) U.S. Cl.
CPC ........ *G02F 1/133345* (2013.01); *G02F 1/1362* (2013.01); *G02F 1/134363* (2013.01); *G02F 2001/133357* (2013.01); *G02F 2202/42* (2013.01); *Y10T 428/10* (2015.01); *Y10T 428/1059* (2015.01)

(58) Field of Classification Search
CPC ............ G02F 1/133345; G02F 1/1343; G02F 2001/133354; B32B 2457/20; B32B 2457/202; Y10T 428/10; Y10T 428/1059; Y10T 428/1064; Y10T 428/1082
USPC ............... 428/1.1, 1.5, 1.55; 349/138, 139
See application file for complete search history.

(56) References Cited

U.S. PATENT DOCUMENTS

| | | | |
|---|---|---|---|
| 5,268,777 A * | 12/1993 | Sato ............................... | 349/49 |
| 5,986,724 A | 11/1999 | Akiyama et al. | |
| 6,072,454 A | 6/2000 | Nakai et al. | |
| 8,184,253 B2 | 5/2012 | Kubota et al. | |
| 2013/0020591 A1 * | 1/2013 | Park et al. ....................... | 257/88 |

FOREIGN PATENT DOCUMENTS

| | | |
|---|---|---|
| JP | 07-020482 | 1/1995 |
| JP | 09-138428 | 5/1997 |
| JP | 11-052416 | 2/1999 |
| JP | 2006-011238 | 1/2006 |
| KR | 10-2003-0073878 | 9/2003 |

* cited by examiner

*Primary Examiner* — Ruiyun Zhang
(74) *Attorney, Agent, or Firm* — INNOVATION COUNSEL LLP

(57) ABSTRACT

A display panel is provided. The display panel includes a plurality of signal lines and a plurality of pixels disposed on a first substrate, wherein each pixel is connected to a corresponding signal line. Each pixel includes a first electrode and a second electrode configured to form an electric field with the first electrode, a first dielectric layer disposed between the first electrode and the second electrode, and a second dielectric layer disposed between the first electrode and the second electrode. The first dielectric layer includes a ferroelectric material and the second dielectric layer includes a paraelectric material.

13 Claims, 11 Drawing Sheets

DISPLAY PANEL

CROSS-REFERENCE TO RELATED APPLICATIONS

This U.S. non-provisional patent application claims priority under 35 U.S.C. §119 to Korean Patent Application No. 10-2013-0098721 filed on Aug. 20, 2013, the entire contents of which are herein incorporated by reference.

BACKGROUND

1. Field of Disclosure

The present disclosure relates to a display panel, and more particularly, to a display panel having a reduced driving voltage.

2. Description of the Related Art

A cathode ray tube display apparatus generally has thick form factor and requires high power consumption. In recent years, various types of flat panel display apparatus (for example, organic light-emitting display apparatus, liquid crystal display apparatus, and plasma display apparatus) have been developed to replace the cathode ray tube display apparatus.

A flat panel display apparatus typically includes a plurality of pixels and a plurality of signal lines for providing signals to the plurality of pixels. Each signal line includes a thin film transistor connected to a corresponding signal line. Each pixel operates in response to a data voltage applied from the corresponding signal line, thereby generating a target image.

SUMMARY

The present disclosure is directed to a display panel that is operable at low driving voltages.

According to some embodiments of the inventive concept, a display panel is provided. The display panel includes a plurality of signal lines and a plurality of pixels disposed on a first substrate, wherein each pixel is connected to a corresponding signal line. Each pixel includes a first electrode and a second electrode configured to form an electric field with the first electrode; a first dielectric layer disposed between the first electrode and the second electrode, the first dielectric layer including a ferroelectric material; and a second dielectric layer disposed between the first electrode and the second electrode, the second dielectric layer including a paraelectric material.

In some embodiments, the first dielectric layer may include at least one of polyvinylidene fluoride (PVDF), poly(vinylidene fluoride-trifluoroethylene) (P(VDF-TrFE)), MXD6 nylon, PZT (Pb(Zr, Ti)O$_3$), SBT (SrBi$_2$Ta$_2$O$_9$), BLT ((Bi$_x$, La$_{1-x}$)$_4$Ti$_3$O$_{12}$), SBTN (SrBi$_2$(Ta, Nb)O$_9$), and BST (Ba$_x$Sr$_{(1-x)}$TiO$_3$).

In some embodiments, the second dielectric layer may include a material having a lower dielectric constant than the first dielectric layer.

In some embodiments, the second dielectric layer may include at least one of polyvinyl cinnamate, polyvinyl phenol, polyvinyl alcohol, polyimide, silicon oxide, and silicon nitride.

In some embodiments, the second dielectric layer may be directly disposed on one side of the first dielectric layer.

In some embodiments, the display panel may further include a third dielectric layer disposed between the first electrode and the second electrode, the third dielectric layer including the paraelectric material, wherein the first dielectric layer may be disposed between the second dielectric layer and the third dielectric layer.

In some embodiments, the first dielectric layer may have a lower thickness than the second dielectric layer.

In some embodiments, the display panel may further include a second substrate disposed on the first substrate, and a liquid crystal layer disposed between the first substrate and the second substrate.

In some embodiments, the second electrode may include a plurality of slits.

In some embodiments, the signal lines may include a plurality of gate lines extending in a first direction and arranged in a second direction crossing the first direction, and a plurality of data lines crossing the plurality of gate lines and insulated from the gate lines, wherein each pixel may be connected to a corresponding gate line and a corresponding data line from among the plurality of gate lines and data lines.

In some embodiments, the display panel may further include a common electrode line disposed on the first substrate and insulated from the signal lines, wherein the second electrode may be connected to the common electrode line.

According to some other embodiments of the inventive concept, a display panel is provided. The display panel includes a first display substrate including a gate line extending in a first direction, a data line extending in a second direction crossing the first direction, and a storage line spaced apart from the gate line; a second display substrate disposed on the first display substrate; and a pixel connected to the gate line and the data line. The pixel includes a thin film transistor connected to the gate line and the data line; a first electrode connected to the thin film transistor, the first electrode overlapping with the storage line with an insulating layer disposed therebetween; and a second electrode configured to form an electric field with the first electrode. The insulating layer includes a first dielectric layer including a ferroelectric material; and a second dielectric layer disposed on one side of the first dielectric layer, the second dielectric layer including a paraelectric material.

In some embodiments, the first dielectric layer may include at least one of polyvinylidene fluoride (PVDF), poly(vinylidene fluoride-trifluoroethylene) (P(VDF-TrFE)), MXD6 nylon, PZT (Pb(Zr, Ti)O$_3$), SBT (SrBi$_2$Ta$_2$O$_9$), BLT ((Bi$_x$, La$_{1-x}$)$_4$Ti$_3$O$_{12}$), SBTN (SrBi$_2$(Ta, Nb)O$_9$), and BST (Ba$_x$Sr$_{(1-x)}$TiO$_3$).

In some embodiments, the second dielectric layer may include a material having a lower dielectric constant than the first dielectric layer.

In some embodiments, the second dielectric layer may include at least one of polyvinyl cinnamate, polyvinyl phenol, polyvinyl alcohol, polyimide, silicon oxide, and silicon nitride.

In some embodiments, the first dielectric layer and the second dielectric layer may be stacked between the first electrode and the storage line.

In some embodiments, the display panel may further include a third dielectric layer disposed between the first electrode and the storage line, the third dielectric layer including the paraelectric material, wherein the first dielectric layer may be disposed between the second dielectric layer and the third dielectric layer.

In some embodiments, the display panel may further include a liquid crystal layer disposed between the first display substrate and the second display substrate.

In some embodiments, the first electrode may be disposed on the first display substrate, and the second electrode may be disposed on the second display substrate.

DETAILED DESCRIPTION

Figure 1:
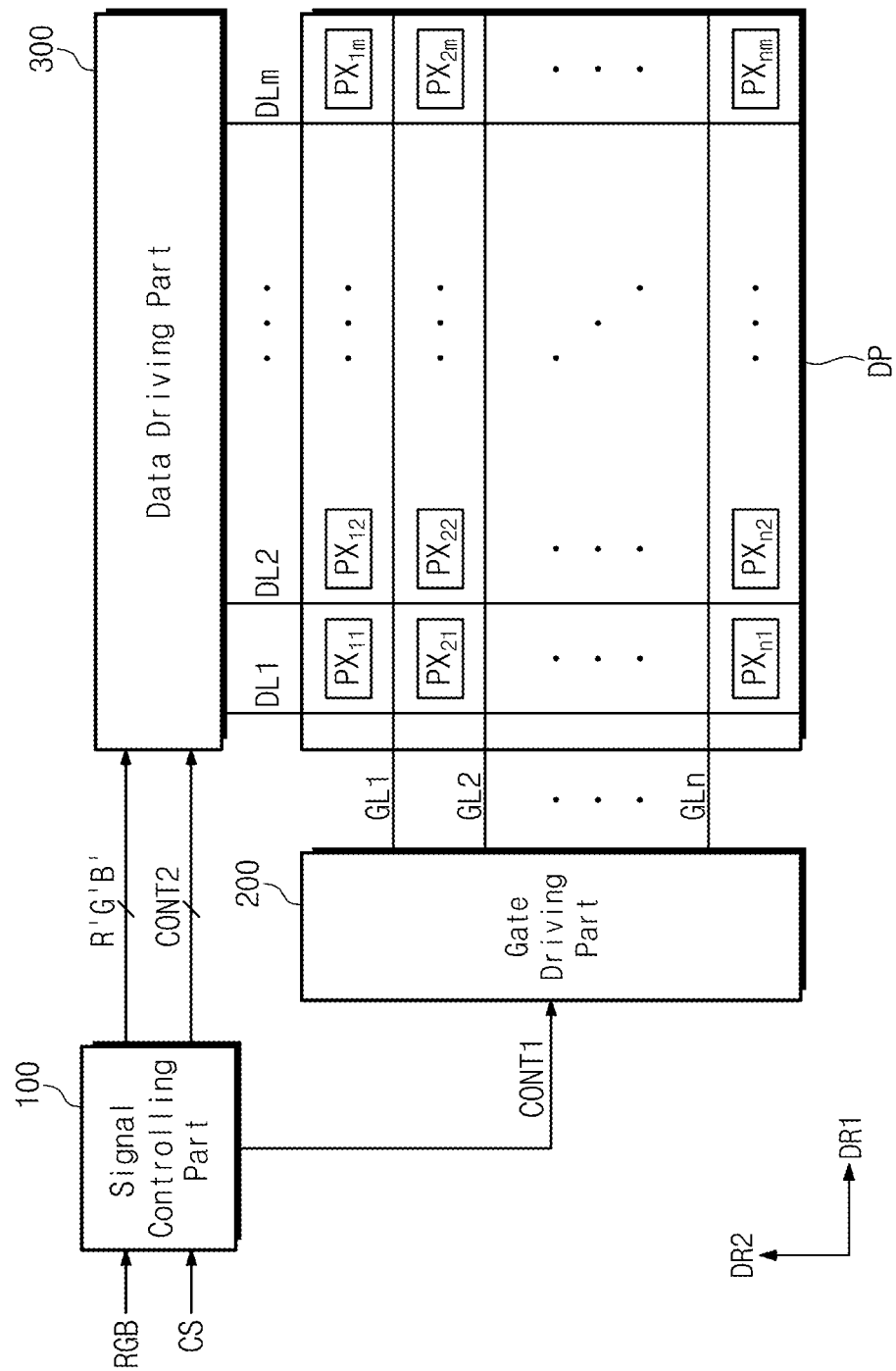
FIG. 1 is a block diagram of a display panel according to an embodiment of the inventive concept.

Exemplary embodiments of the inventive concept will be described below in detail with reference to the accompanying drawings. The inventive concept may be embodied in different forms and should not be construed as being limited to the described embodiments. In the drawings, the dimensions of layers and regions may be exaggerated for clarity.

Figure 2:
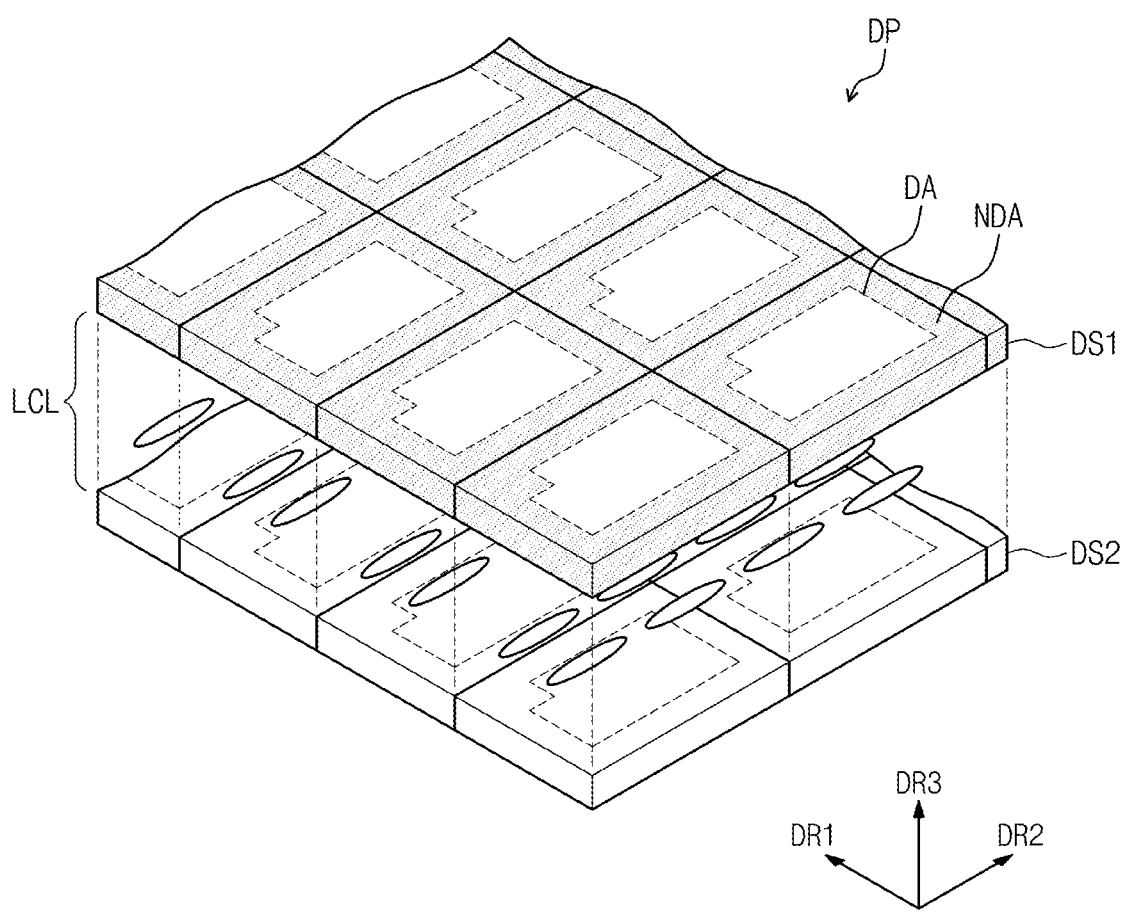
FIG. 2 is a partial perspective view of the display panel illustrated in FIG. 1.

FIG. 1 is a block diagram of a display panel according to an embodiment of the inventive concept. FIG. 2 is a partial perspective view of the display panel illustrated in FIG. 1.

With reference to FIG. 1, a display apparatus according to an embodiment of the inventive concept includes a display panel DP, a signal controlling part 100, a gate driving part 200, and a data driving part 300. The display panel DP includes, but is not limited to, an organic light-emitting display panel, a liquid crystal display panel, a plasma display panel, an electrophoretic display panel, or an electrowetting display panel.

In some embodiments, the display apparatus may be provided as a liquid crystal display apparatus. The display panel DP of the liquid crystal display apparatus includes a liquid crystal display panel. Referring to FIG. 2, the display panel DP of the liquid crystal display apparatus includes a first display substrate DS1, a second display substrate DS2, and a liquid crystal layer LCL disposed between the first and second display substrates DS1 and DS2.

In some embodiments (not illustrated), the liquid crystal display apparatus further includes a backlight unit (for providing light to the display panel DP) and a pair of polarizing plates. Also, the display panel DP may include a liquid crystal panel having at least one mode selected from a vertical alignment (VA) mode, a patterned vertical alignment (PVA) mode, an in-plane switching (IPS) mode, a fringe-field switching (FFS) mode, and a plane-to-line switching (PLS) mode.

The display panel DP includes a plurality of signal lines and a plurality of pixels $PX_{11}$-$PX_{nm}$ connected to the signal lines. The signal lines include a plurality of gate lines $GL_1$-$GL_n$ and a plurality of data lines $DL_1$-$DL_m$. The gate lines $GL_1$-$GL_n$ are arranged in a second direction DR2 and extend in a first direction DR1. The data lines $DL_1$-$DL_{1m}$ are arranged crossing the gate lines $GL_1$-$GL_n$, and are insulated from the gate lines $GL_1$-$GL_n$.

The pixels $PX_{11}$-$PX_{nm}$ may be arranged in a matrix shape. Each of the pixels $PX_{11}$-$PX_{nm}$ is connected to a corresponding gate line and data line (from the gate lines $GL_1$-$GL_n$ and data lines $DL_1$-$DL_{1m}$).

Figure 4:
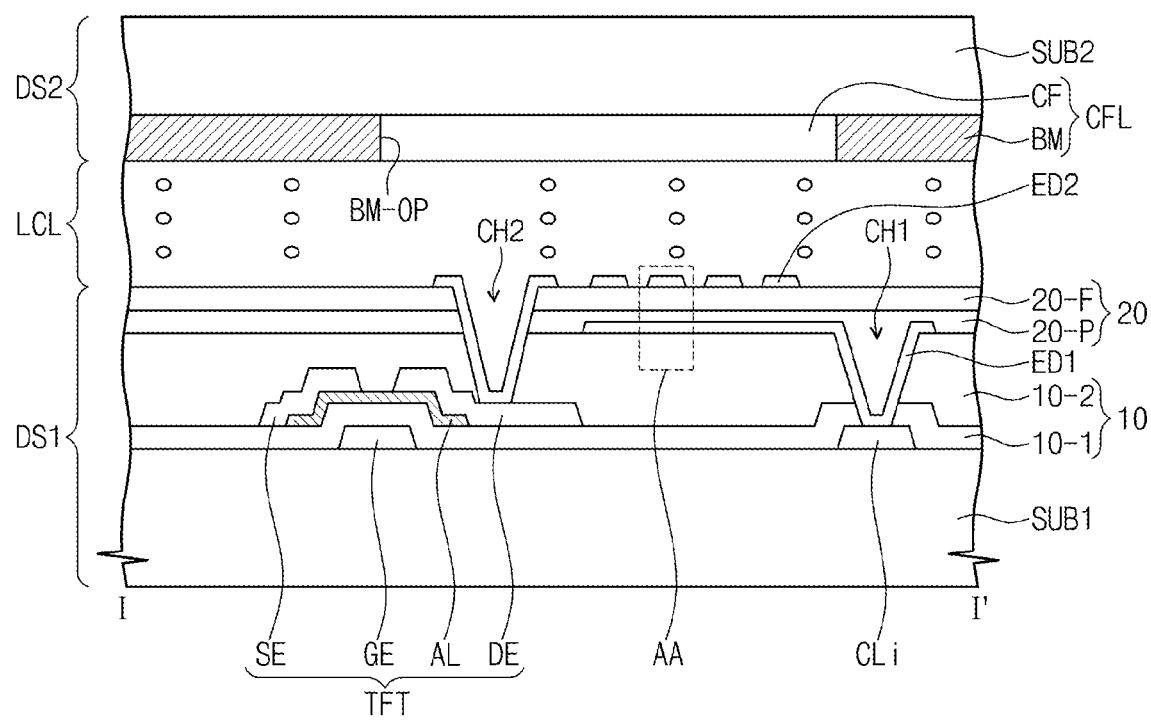
FIG. 4 is a cross-sectional view of the display panel taken along line I-I' of FIG. 3.

The gate lines $GL_1$-$GL_n$, data lines $DL_1$-$DL_{1m}$, and pixels $PX_{11}$-$PX_{nm}$ are disposed on the first display substrate DS1 on an upper portion of the liquid crystal layer LCL. Referring to FIG. 4, the second display substrate DS2 is disposed at a distance from the first display substrate DS1 in a thickness direction DR3. A color filter layer CFL is disposed on the second display substrate DS2. The first display substrate DS1 and the second display substrate DS2 will be described in more detail as follows.

Referring to FIG. 2, the display panel DP includes a plurality of display areas DA and a non-display area NDA disposed adjacent to the display areas DA. The display areas DA transmit light generated from the backlight unit. The non-display area NDA blocks the light generated from the backlight unit. The gate lines $GL_1$-$GL_n$ and the data lines $DL_1$-$DL_{1m}$ are disposed overlapping with each other in the non-display area NDA.

Each of the pixels $PX_{11}$-$PX_{nm}$ is disposed in a corresponding display area DA. The display areas DA and the non-display area NDA may be defined by the color filter layer CFL.

Referring to FIG. 1, during operation of the display panel DP, the signal controlling part 100 receives input image signals RGB and transforms the input image signals RGB into image data R'G'B'. The signal controlling part 100 also receives various control signals CS (for example, a vertical synchronization signal, a horizontal synchronization signal, a main clock signal, and/or a data enable signal). The signal controlling part 100 then outputs a first control signal CONT1 to the gate driving part 200. The signal controlling part 100 also outputs a second control signal CONT2 and the image data R'G'B' to the data driving part 300.

The gate driving part 200 outputs gate signals to the plurality of gate lines $GL_1$-$GL_n$ in response to the first control signal CONT1. The first control signal CONT1 includes a vertical initiation signal to initiate operation of the gate driving part 200, a gate clock signal for determining the output time of the gate voltage, and an output enable signal for determining the pulse width of the gate voltage.

The data driving part 300 receives the second control signal CONT2 and the image data R'G'B'. The data driving part 300 transforms the image data R'G'B' into data voltage and provides the data voltage to the data lines $DL_1$-$DL_{1m}$.

The second control signal CONT2 includes a horizontal initiation signal to initiate operation of the data driving part 300, an inverting signal for inverting the polarity of the data voltage, and an output instruction signal for determining the output time of the data voltage from the data driving part 300.

Figure 3:
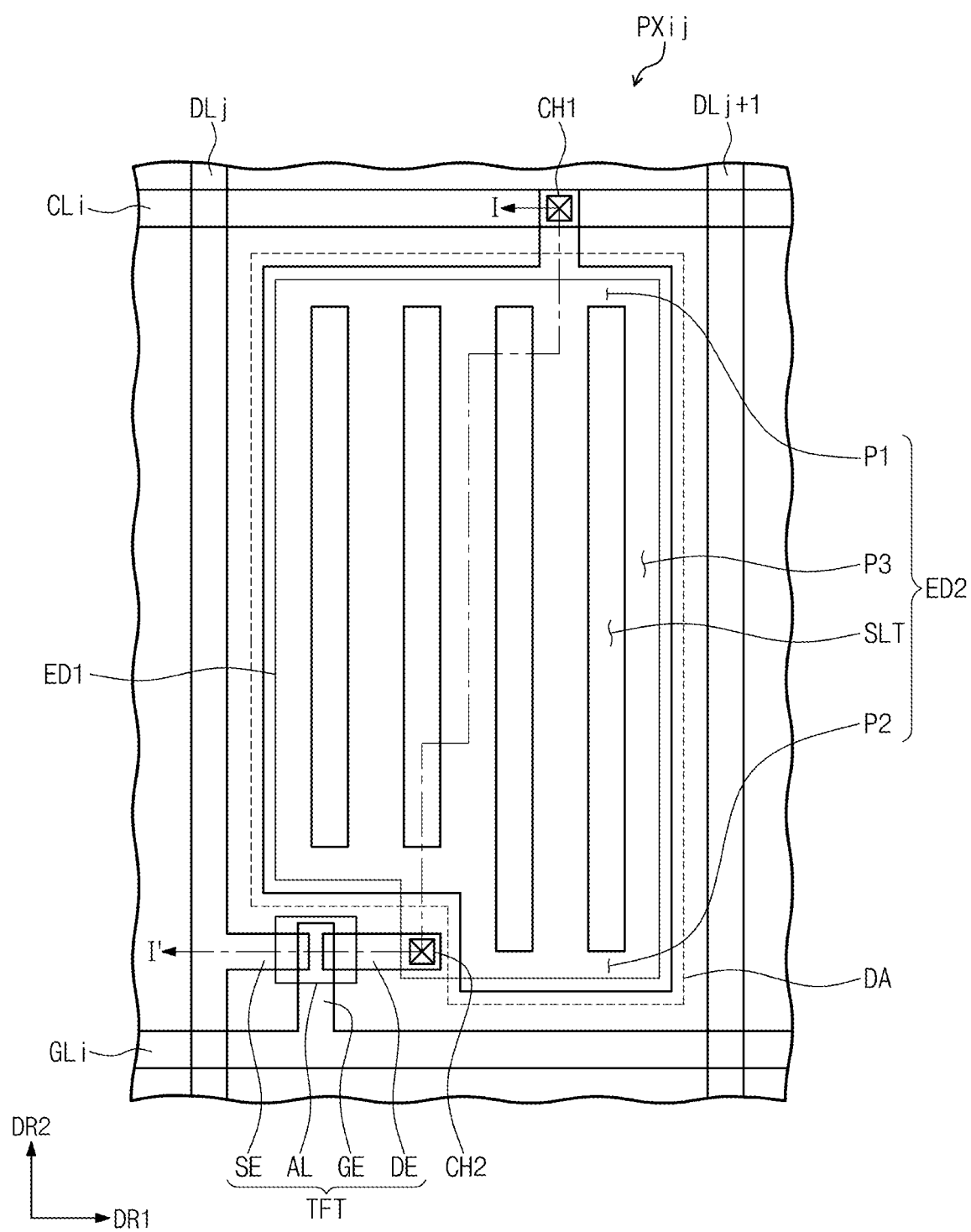
FIG. 3 is a plan view of a pixel according to an embodiment of the inventive concept.

FIG. 3 is a plan view of a pixel according to an embodiment of the inventive concept. FIG. 4 is a cross-sectional view of the display panel taken along line I-I' of FIG. 3.

FIG. 3 illustrates a pixel $PX_{ij}$ of a plane-to-line switching (PLS) mode. Nevertheless, it should be noted that the pixel $PX_{ij}$ is not limited to the PLS mode. For example, the pixel $PX_{ij}$ may include one or more other modes, such as a vertical alignment (VA) mode, a patterned vertical alignment (PVA) mode, an in-plane switching (IPS) mode, or a fringe-field switching (FFS) mode.

Referring to FIGS. 3 and 4, the first display substrate DS1 includes a first base substrate SUB1, a gate line $GL_i$, data lines $DL_j$ and $DL_{j+1}$, a plurality of insulating layers 10 and 20, and a pixel $PX_{ij}$. The gate line $GL_i$, data lines $DL_j$ and $DL_{j+1}$, insulating layers 10 and 20, and pixel $PX_{ij}$ are disposed on a surface of the first base substrate SUB1. The first base substrate SUB1 may include a transparent substrate (such as a glass substrate, a plastic substrate, a silicon substrate, or other types of transparent substrates).

The first display substrate DS1 further includes a common line $CL_i$ for applying a common voltage. In the example of FIGS. 3 and 4, only one common line $CL_i$ is illustrated. Nevertheless, it should be noted that the display panel DP may include a plurality of common lines $CL_i$ corresponding to the plurality of gate lines $GL_1$-$GL_n$. The common lines $CL_i$ may be arranged in the second direction DR2 and may extend in the first direction DR1. In some particular embodiments, the common line(s) $CL_i$ may be omitted in pixels other than the pixel $PX_{ij}$ of the PLS mode.

The pixel $PX_{ij}$ includes a thin film transistor TFT, a first electrode ED1, and a second electrode ED2. The thin film transistor TFT is disposed in the non-display area NDA. The first electrode ED1 and the second electrode ED2 are disposed overlapping each other in the display area DA. In some embodiments, the thin film transistor TFT may be disposed in the display area DA.

The thin film transistor TFT includes a gate electrode GE, a source electrode SE, a drain electrode DE, and a semiconductor layer AL.

The gate electrode GE and the gate line $GL_i$ are disposed on a surface of the first base substrate SUB1. The gate electrode GE is connected to the gate line $GL_i$. The gate electrode GE and the gate line $GL_i$ may be formed of a same material and layer structure. The gate electrode GE and the gate line $GL_i$ may include copper (Cu), aluminum (Al), or an alloy thereof. The gate electrode GE and the gate line $GL_i$ may be formed as a multi-layer structure including an aluminum layer and another different metal layer.

The common line $CL_i$ is disposed on the same layer as the gate line $GL_i$. The common line $CL_i$ may be formed of the same material and layer structure as the gate line $GL_i$. The gate electrode GE, the gate line $GL_i$, and the common line $CL_i$ may have a high reflectance of external light.

A gate insulating layer 10-1 is disposed on the first base substrate SUB1 covering the gate electrode GE, the gate line $GL_i$, and the common line $CL_i$. A semiconductor layer AL is disposed on the gate insulating layer 10-1 overlapping the gate electrode GE. An ohmic contact (not illustrated) may be disposed on the gate insulating layer 10-1.

The data lines $DL_j$ and $DL_{j+1}$ are disposed on the gate insulating layer 10-1. The data lines $DL_j$ and $DL_{j+1}$ may include copper (Cu), aluminum (Al), or an alloy thereof. The data lines $DL_j$ and $DL_{j+1}$ may be formed as a multi-layer structure including an aluminum layer and another different metal layer (for example, chromium or molybdenum). The data lines $DL_j$ and $DL_{j+1}$ may have a high reflectance of external light.

The source electrode SE is connected to the data line $DL_j$. The source electrode SE may be formed of the same material and layer structure as the data lines $DL_j$ and $DL_{j+1}$.

The drain electrode DE is disposed on the gate insulating layer 10-1 spaced apart from the source electrode SE. The source electrode SE and the drain electrode DE are formed overlapping with respective end portions of the semiconductor layer AL.

A planarization layer 10-2 is disposed on the gate insulating layer 10-1 covering the source electrode SE, the drain electrode DE, and the data lines $DL_j$ and $DL_{j+1}$. The common electrode CE is disposed on the planarization layer 10-2. The first electrode ED1 is connected to the common line $CL_i$ via a first through hole CH1 formed in the gate insulating layer 10-1 and the planarization layer 10-2.

A passivation layer 20 is disposed on the planarization layer 10-2 covering the first electrode ED1. The second electrode ED2 is disposed on the passivation layer 20 overlapping the first electrode ED1. The second electrode ED2 is connected to the drain electrode DE via a second through hole CH2 formed in the planarization layer 10-2 and the passivation layer 20. In some embodiments (not illustrated), a protection layer (for protecting the second electrode ED2) and an alignment layer may be further disposed on the passivation layer 20.

Referring to FIG. 3, the second electrode ED2 includes a plurality of slits SLT. The second electrode ED2 may include a first horizontal part P1, a second horizontal part P2 separated from the first horizontal part P1, and a plurality of vertical parts P3 connecting the first horizontal part P1 and the second horizontal part P2. The slits SLT are disposed between the vertical parts P3. In the example of FIG. 3, the slits SLT are formed having a rectangular shape. Nevertheless, it should be noted that the slits SLT are not limited to a rectangular shape and may include other shapes.

In the embodiment of FIG. 4, the first electrode ED1 and the second electrode ED2 form an electric field. The passivation layer 20 is disposed between the first electrode ED1 and the second electrode ED2. The passivation layer 20 may be formed as a stacked layer including a plurality of dielectric layers. The plurality of dielectric layers may include a first dielectric layer 20-F and a second dielectric layer 20-P.

The first dielectric layer 20-F includes a ferroelectric material. The ferroelectric material has spontaneous polarity (i.e., its polarity is inverted by an applied electric field). Due to the spontaneous polarity, ionic polarization occurs within crystals in the ferroelectric material. As a result of the ionic polarization, the ferroelectric material may exhibit polarity even in the absence of an external electric field. Generally, the ferroelectric material has a high dielectric constant.

The ferroelectric material may include an inorganic ferroelectric material and/or an organic ferroelectric material. The inorganic ferroelectric material may include a ferroelectric oxide material, a ferroelectric fluoride material, or a ferroelectric semiconductor. The organic ferroelectric material may include a polymer ferroelectric material.

In some embodiments, the first dielectric layer 20-F may include at least one of the following materials: polyvinylidene fluoride (PVDF), poly(vinylidene fluoride-trifluoroethylene) (P(VDF-TrFE)), MXD6 nylon, PZT ($Pb(Zr, Ti)O_3$), SBT ($SrBi_2Ta_2O_9$), BLT (($Bi_x, La_{1-x})_4Ti_3O_{12}$), SBTN ($SrBi_2(Ta, Nb)O_9$), and BST ($Ba_xSr_{(1-x)}TiO_3$). The first dielectric layer 20-F may be formed as a single layer or a multi-layer stacked structure.

The second dielectric layer 20-P includes a paraelectric material. The second dielectric layer 20-P generally includes an insulating material. The second dielectric layer 20-P may include, but is not limited to, a material having a lower dielectric constant than the first dielectric layer 20-F. In some embodiments, the second dielectric layer 20-P may include at least one of the following materials: polyvinyl cinnamate, polyvinyl phenol, polyvinyl alcohol, polyimide, silicon oxide, and silicon nitride.

The thin film transistor TFT outputs the data voltage applied to a data line $DL_j$ in response to the gate signal applied to a gate line $GL_i$. The first electrode ED1 receives the common voltage, and the second electrode ED2 receives a pixel voltage corresponding to the data voltage. The first electrode ED1 and the second electrode ED2 form a lateral electric field which changes the direction of the molecules in the liquid crystal layer LCL.

In some embodiments (not illustrated), the first electrode ED1 may include a pixel electrode connected to the drain electrode DE of the thin film transistor TFT, and the second electrode ED2 may include a common electrode connected to the common electrode line $CL_i$. In those embodiments, the first electrode ED1 may further include a plurality of slits. The first electrode ED1 may receive the pixel voltage corresponding to the data voltage, and the second electrode ED2 may receive the common voltage. The first electrode ED1 and the second electrode ED2 form a lateral electric field which changes the alignment of the molecules in the liquid crystal layer LCL.

The first electrode ED1, second electrode ED2, and passivation layer 20 are described in more detail with reference to the region AA in FIG. 4. The region AA corresponds to a capacitor for controlling the operation of the liquid crystal layer LCL. The capacitor forms an electric field between the first electrode ED1 and the second electrode ED2.

The capacitor includes the passivation layer 20 as a dielectric layer disposed between the first electrode ED1 and the second electrode ED2. The alignment of the liquid crystal layer LCL can be controlled through the voltages applied to the first electrode ED1 and the second electrode ED2, and by configuring the dielectric properties of the passivation layer 20.

In some embodiments, the liquid crystal layer LCL and the passivation layer 20 are disposed in series with the first electrode ED1 and the second electrode ED2. Since the liquid crystal layer LCL is also an insulating layer, the liquid crystal layer LCL and the passivation layer 20 may be represented as a single dielectric layer. When two dielectric layers are disposed in series, the voltage applied to each dielectric layer is given by Equation (1) below:

$$V_{LCL} = \frac{C_I}{C_I + C_{LCL}} \cdot V \quad (1)$$

As shown in Equation (1), the voltage (V) applied to the first electrode ED1 and the second electrode ED2, and the capacitance ($C_{LCL}$) of the liquid crystal layer LCL are commonly applied to each of the liquid crystal layer LCL and the passivation layer 20. The voltage ($V_{LCL}$) applied to the liquid crystal layer LCL is proportional to the dielectric constant ($C_I$) of the passivation layer 20.

According to Equation (1), a higher voltage may be distributed to the liquid crystal layer LCL due to the increase in capacitance of the passivation layer 20 when the same external voltage is applied. In other words, as the capacitance of the passivation layer 20 increases, the driving voltage for driving the liquid crystal layer LCL may decrease, thereby reducing power consumption of the display apparatus. The capacitance properties of the passivation layer 20 will be explained in more detail with reference to FIGS. 5A and 5B.

Figure 5A:
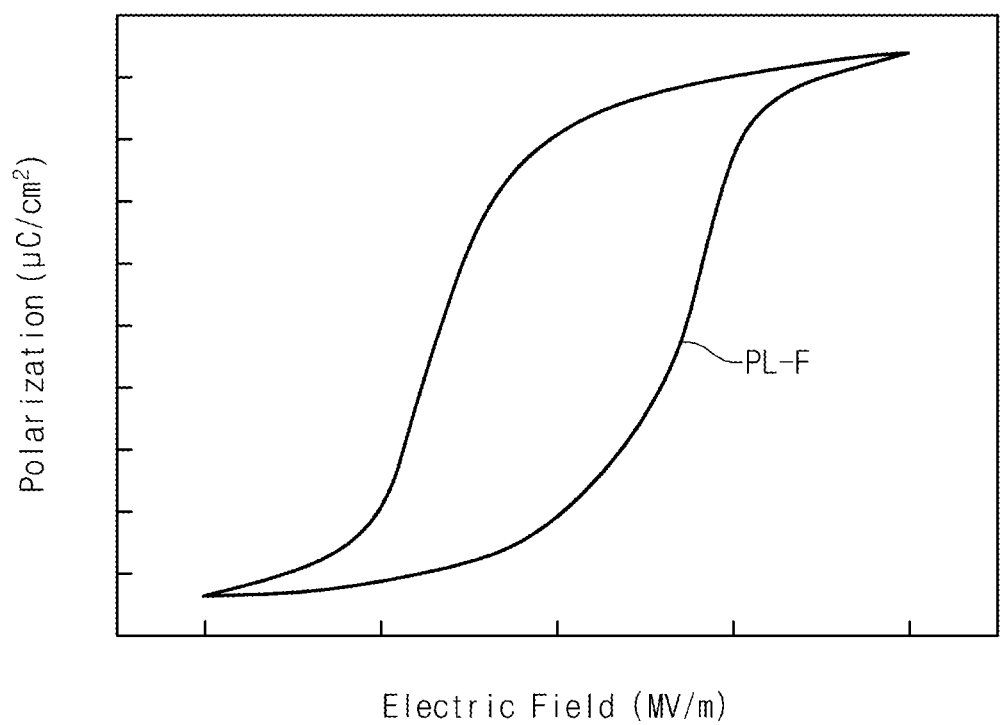
FIG. 5A is a graph of the electric field polarization of a first dielectric layer.
Figure 5B:
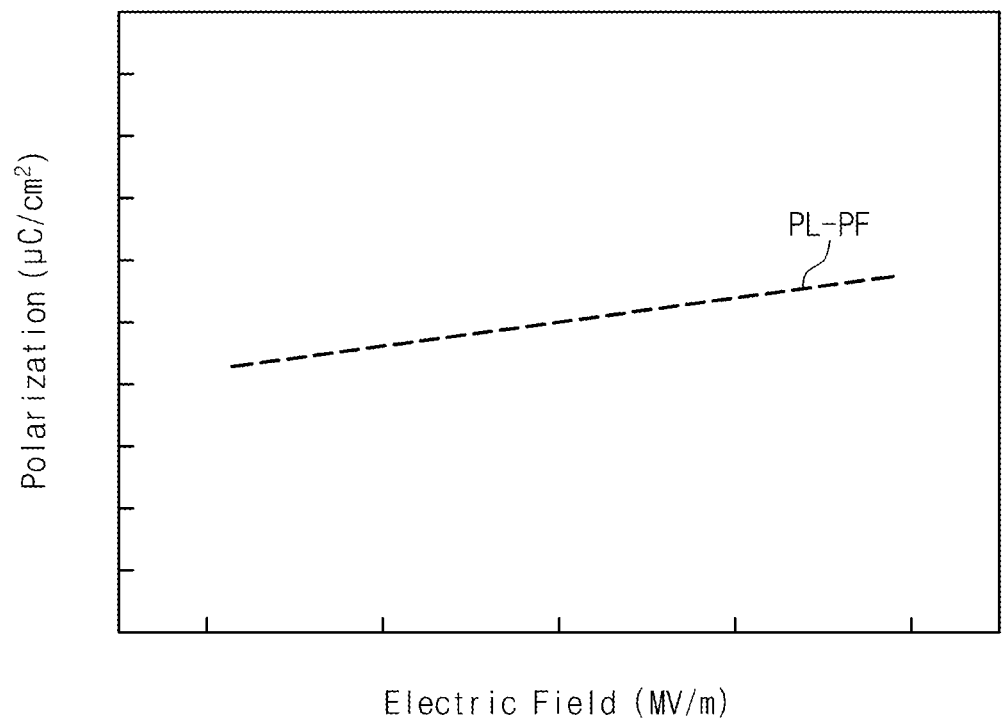
FIG. 5B is a graph of the electric field polarization of a stacked layer according to an embodiment of the inventive concept.

FIG. 5A is a graph of the electric field polarization of a first dielectric layer 20-F. FIG. 5B is a graph of the electric field polarization of a passivation layer 20 according to an embodiment of the inventive concept. Specifically, FIGS. 5A and 5B illustrate the change in polarization of the layers when an external electric field is applied respectively to a first dielectric layer 20-F and a stacked layer. In the example of FIG. 5B, the stacked layer includes the first dielectric layer 20-F and the second dielectric layer 20-P. The first dielectric layer 20-F includes poly(vinylidene fluoride-trifluoroethylene) (P(VDF-TrFE)) and the second dielectric layer 20-P includes Polyvinylpyrrolidone (PVP).

As described previously, the ferroelectric material has spontaneous polarity and polarization inverting properties. Referring to FIG. 5A, the graph of the electric field polarization of the first dielectric layer 20-F including the ferroelectric material is shown as a hysteresis loop PL-F. The degree of polarization of the ferroelectric material increases with the magnitude of the external electric field, and saturates to a first polarization value. However, the increase in the degree of polarization of the ferroelectric material is not linear.

When an inverse external electric field is applied, the polarization value of the ferroelectric material does not return to zero. Instead, the ferroelectric material continues to exhibit a certain degree of polarization even when the external electric field is zero. It is noted that a stronger inverse electric field may be necessary such that the ferroelectric material would have zero polarization. However, the stronger inverse electric field may lead to higher power consumption. The inverse electric field corresponds to a coercive field.

When the inverse external electric field is applied, a graph (similar to the graph when a normal direction electric field is applied) having a second saturation polarization value in the inverse direction may be obtained. The dielectric flux density of the ferroelectric material is not the same when increasing the electric field and when decreasing the electric field, and thus the polarization shows different hysteresis routes. Accordingly, the graph of the electric field polarization of the ferroelectric material generally displays a hysteresis loop.

As mentioned previously, the voltage applied to the first electrode ED1 and the second electrode ED2 controls the alignment of the liquid crystal layer LCL. Since the ferroelectric material has remnant polarization, a coercive field having inverse polarity may be necessary to remove the remnant polarization (so as to obtain a zero polarization state).

Due to the electric field polarization having a closed loop shape, it may be difficult to control the behavior of the liquid crystal layer LCL. The liquid crystal layer LCL may be controlled when an accurate electric field corresponding to the coercive field is applied. However, if an electric field (that is different from the coercive field) is applied, the ferroelectric material may exhibit entirely different polarization properties. Thus, the remnant polarization continues to be present even in the absence of an externally applied electric field, thereby rendering it difficult to obtain an accurate expression of the gray scale. Since a higher driving voltage is often necessary to remove the remnant polarization, the power consumption of the display apparatus may increase.

FIG. 5B is a graph of the electric field polarization of a stacked layer according to an embodiment of the inventive concept. The stacked layer includes the first dielectric layer 20-F and the second dielectric layer 20-P. In contrast to FIG. 5A, the electric field polarization plot PL-PF of the stacked layer in FIG. 5B displays linearity. The polarization of the stacked layer increases and decreases proportionally to the externally applied electric field. It should be noted that the stacked layer shows an electric field polarization plot similar to that of the second dielectric layer 20-P (not illustrated).

In the embodiment of FIG. 5B, the electric field polarization plot PL-PF of the stacked layer does not display the remnant polarization properties of the first dielectric layer 20-F because the second dielectric layer 20-P removes the remnant polarization properties of the first dielectric layer 20-F. By stacking the first dielectric layer 20-F and the second dielectric layer 20-P, the first dielectric layer 20-F loses its remnant polarization properties. Accordingly, the stacked layer has the same hysteresis properties as those of a common paraelectric material. When the externally applied electric field increases, the polarization increases in a normal direction; and when an inverse external electric field is applied, the polarization proceeds in an inverse direction. When the externally applied electric field is zero, the stacked layer does not have polarity (i.e., no remnant polarization). Thus, the polarization properties of the stacked layer may be easily controlled by the externally applied electric field.

Figure 6A:
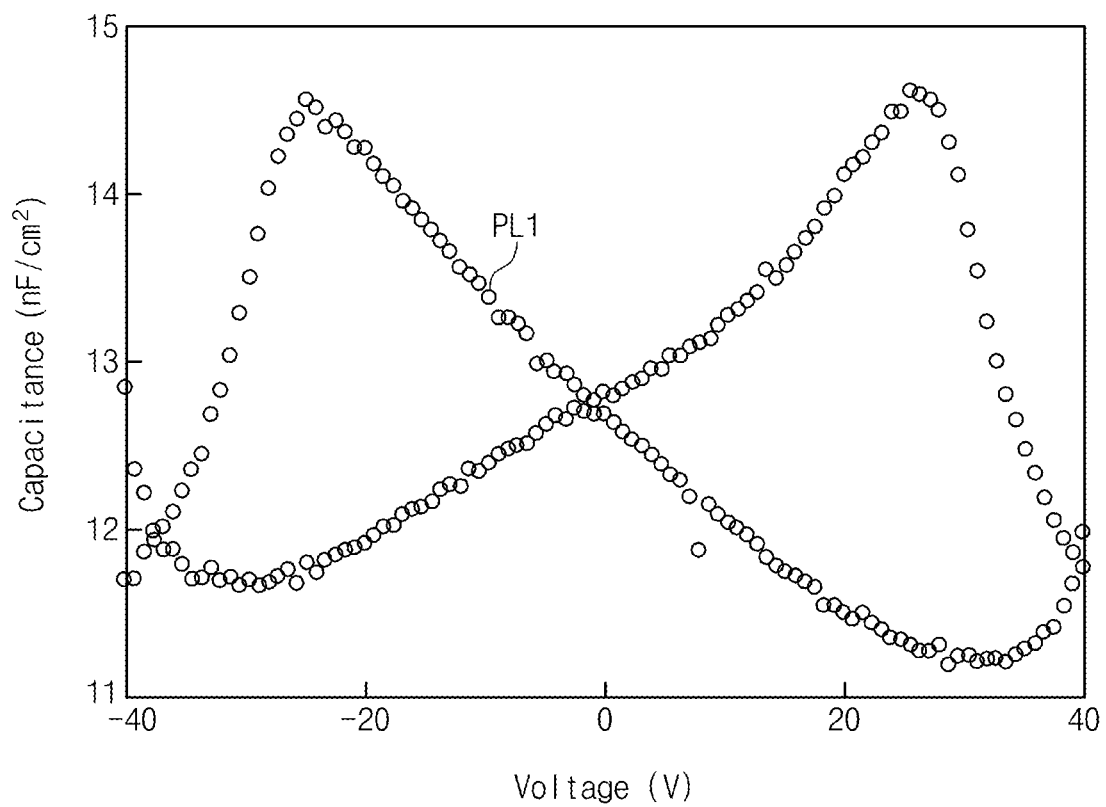
FIG. 6A is a graph illustrating the change in capacitance of a first dielectric layer with an externally applied voltage.
Figure 6B:
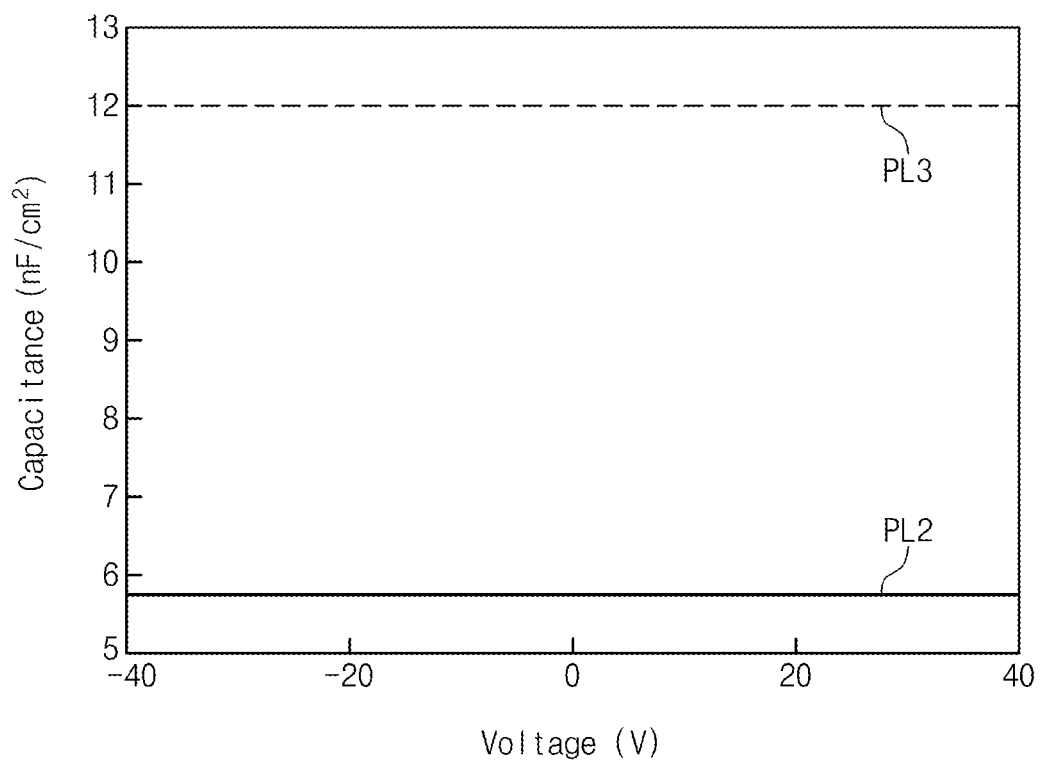
FIG. 6B is a graph illustrating the change in capacitance of a stacked layer with an externally applied voltage according to an embodiment of the inventive concept.

FIG. 6A is a graph illustrating the change in capacitance of a first dielectric layer 20-F with an externally applied voltage. FIG. 6B is a graph illustrating the change in capacitance of a stacked layer with an externally applied voltage according to an embodiment of the inventive concept. FIG. 6B also includes a graph illustrating the change in capacitance of a second dielectric layer 20-P with the externally applied voltage, to aid in explaining the inventive concept.

In the example of FIG. 6A, the first dielectric layer 20-F including a ferroelectric material generally exhibits the voltage-capacitance properties of the ferroelectric material. The capacitance of the ferroelectric material may change along different routes in the hysteresis loop having a closed shape, depending on whether a positive voltage or a negative voltage is applied to the ferroelectric material.

Referring to FIG. 6A, the voltage-capacitance graph PL1 of the first dielectric layer 20-F has a symmetrical butterfly shape in the direction of the externally applied voltage. The capacitance of the first dielectric layer 20-F has two peaks (maximum capacitance) corresponding respectively to when a positive voltage and a negative voltage are applied.

As shown in FIG. 6A, each peak has a capacitance of about 14 to 15 nF/cm$^2$. Each peak occurs when the polarization of dipoles reverses. The electric field generating the peaks corresponds to the coercive field. The voltages at which the peaks occur are referred to as coercive voltages.

As illustrated in FIG. 6A, the capacitance of the first dielectric layer 20-F does not change uniformly with the externally applied voltage. As a result, it may be difficult to control the alignment of the liquid crystal layer LCL using a capacitor consisting of the first dielectric layer 20-F.

In contrast to FIG. 6A, the capacitance plot PL2 of the second dielectric layer 20-P in FIG. 6B is constant and does not change with the externally applied voltage. Since the second dielectric layer 20-P includes a paraelectric material, the capacitance properties of the second dielectric layer 20-P are generally similar to those of the paraelectric material. Since the paraelectric material has inherent dielectricity, the paraelectric material may not be affected by the externally applied voltage.

FIG. 6B further illustrates the capacitance plot PL3 of the passivation layer 20 according to an embodiment of the inventive concept. As mentioned previously, the passivation layer 20 comprises a stacked structure of the first dielectric layer 20-F and the second dielectric layer 20-P.

Comparing the capacitance plot PL1 of the first dielectric layer 20-F in FIG. 6A with the capacitance plot PL3 of the passivation layer 20 in FIG. 6B, it is observed that the capacitance of the passivation layer 20 does not vary with the externally applied voltage. As illustrated in FIG. 6B, the capacitance plot PL3 of the passivation layer 20 is similar to the capacitance plot PL2 of the second dielectric layer 20-P, in that the capacitances in both the capacitance plots PL2 and PL3 are constant regardless of the externally applied voltage. Thus, the capacitance plot PL3 of the passivation layer 20 is similar to that of the paraelectric material.

As previously described, the second dielectric layer 20-P removes the remnant polarization properties of the first dielectric layer 20-F. Thus, the stacked layer in FIG. 6B (comprising the first dielectric layer 20-F and the second dielectric layer 20-P) has a constant capacitance that does not vary with the externally applied voltage.

It is noted that the stacked layer in FIG. 6B displays a lower peak capacitance value when compared to the first dielectric layer 20-F in FIG. 6A. Nevertheless, it may be observed from FIG. 6B that the stacked layer (capacitance plot PL3) has an improved capacitance value relative to the second dielectric layer 20-P (capacitance plot PL2). The second dielectric layer 20-P is configured to remove the remnant polarization properties of the first dielectric layer 20-F, while minimally impacting the high dielectric constant of the first dielectric layer 20-F.

Accordingly, in some embodiments of the inventive concept, by including the first dielectric layer 20-F and the second dielectric layer 20-P in the passivation layer 20, a capacitor may be obtained, whereby the capacitor has a high dielectric constant, no remnant polarization properties, and can be easily controlled by a low driving voltage. Furthermore, the gray scale can be easily controlled at the low driving voltage using the passivation layer 20.

Figure 7A:
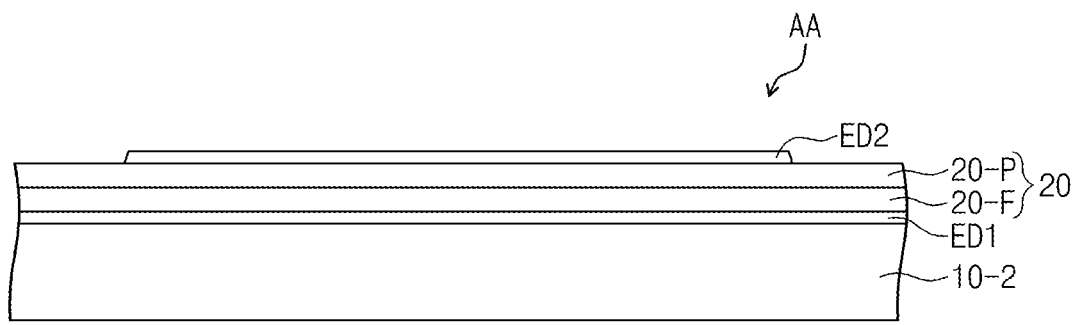
FIG. 7A is a partial cross-sectional view of the region AA in the display panel of FIG. 4.
Figure 7B:
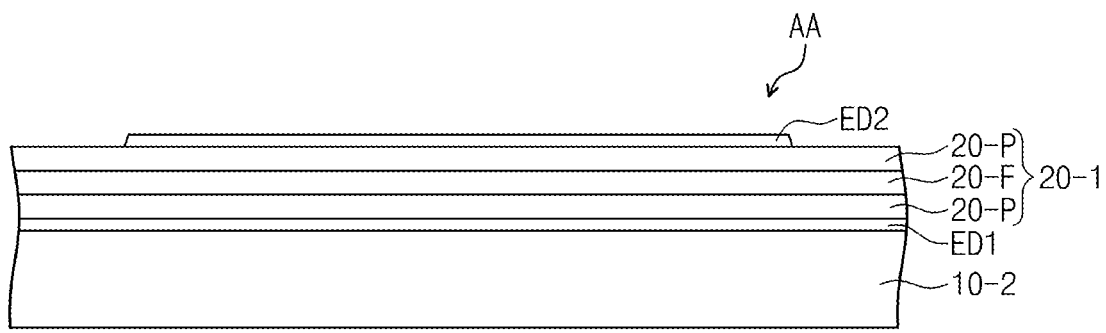
FIG. 7B is a partial cross-sectional view of a display panel according to an embodiment of the inventive concept.

FIG. 7A is a partial cross-sectional view of the region AA in the display panel of FIG. 4. FIG. 7B is a partial cross-sectional view of a display panel according to an embodiment of the inventive concept. In particular, FIG. 7B illustrates a cross-sectional view similar to the region AA of FIG. 7A.

As illustrated in FIG. 7A, the passivation layer 20 is disposed between the first electrode ED1 and the second electrode ED2. The passivation layer 20 is formed as a stacked structure including a plurality of dielectric layers. The plurality of dielectric layers include a first dielectric layer 20-F and a second dielectric layer 20-P. The first dielectric layer 20-F includes a ferroelectric material and the second dielectric layer 20-P includes a paraelectric material.

Referring back to FIG. 4, the first dielectric layer 20-F is disposed on the second dielectric layer 20-P. However, the stacking order of the dielectric layers may be changed. For example, as illustrated in FIG. 7A, the first dielectric layer 20-F may be disposed under the second dielectric layer 20-P. In some embodiments, the second dielectric layer 20-P may be stacked on or under the first dielectric layer 20-F. As previously described, the second dielectric layer 20-P removes the remnant polarization properties of the first dielectric layer 20-F and maintains the high dielectric constant of the first dielectric layer 20-F.

As illustrated in FIG. 7B, a passivation layer 20-1 according to an embodiment of the inventive concept may include the first dielectric layer 20-F and a plurality of second dielectric layers 20-P. The second dielectric layers 20-P may be disposed on the top surface and/or the bottom surface of the first dielectric layer 20-F.

The second dielectric layers 20-P prevent the first dielectric layer 20-F from directly contacting the first electrode ED1 and the second electrode ED2. Thus, the remnant polarization properties of the first dielectric layer 20-F may be effectively reduced or removed by the second dielectric layers 20-P.

In the examples of FIGS. 7A and 7B, the first dielectric layer 20-F and the second dielectric layers 20-P are depicted as having similar thicknesses. Nevertheless, it should be noted that the first dielectric layer 20-F and the second dielectric layers 20-P can have different thicknesses. For example, in some embodiments, the thickness of the second dielectric layer 20-P may be less than the thickness of the first dielectric layer 20-F.

The remnant polarization properties of the first dielectric layer 20-F may decrease when the thickness of the second dielectric layer 20-P increases. However, the capacitance of the stacked layer decreases when the thickness of the second dielectric layer 20-P increases. Accordingly, the thickness of the second dielectric layer 20-P may be designed such that the remnant polarization properties of the first dielectric layer 20-F are reduced without impacting the high dielectric constant of the first dielectric layer 20-F.

Figure 8:
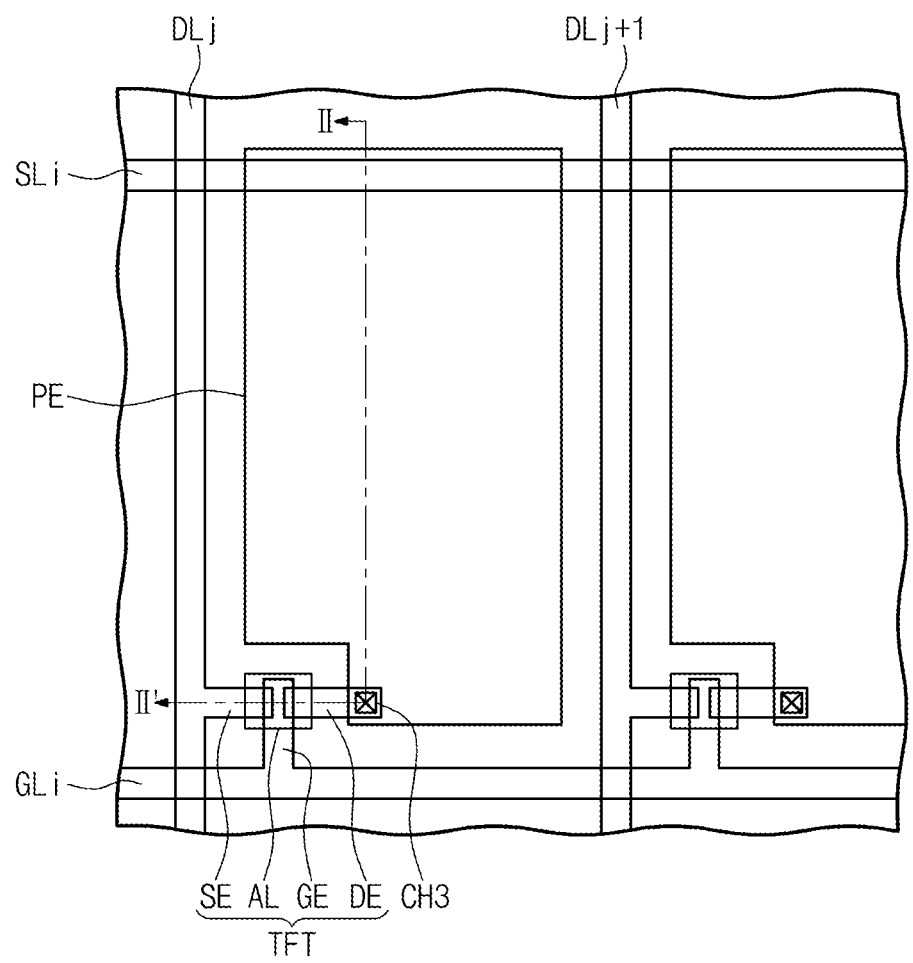
FIG. 8 is a partial plan view of a display panel according to an embodiment of the inventive concept.
Figure 9:
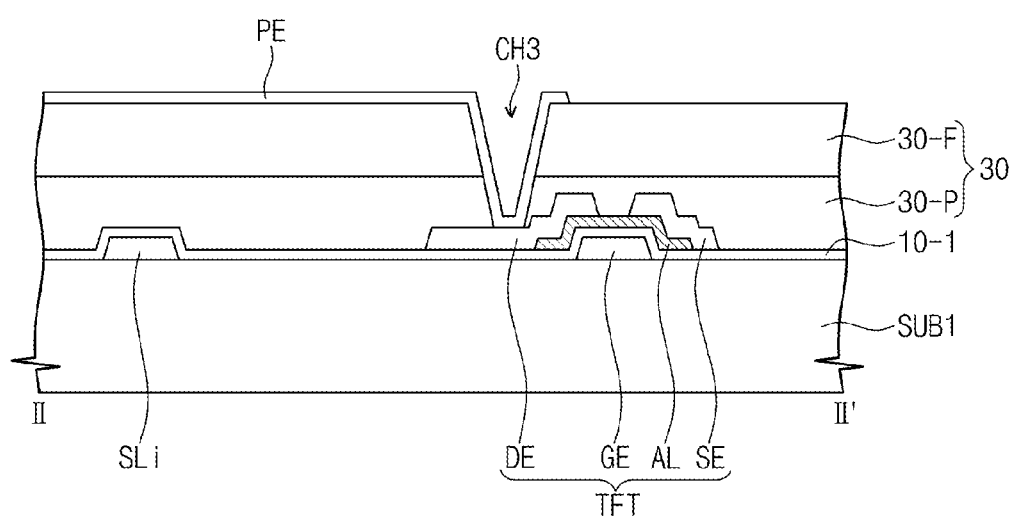
FIG. 9 is a cross-sectional view of the display panel taken along line II-IF of FIG. 8.

FIG. 8 is a partial plan view of a display panel according to an embodiment of the inventive concept. FIG. 9 is a cross-sectional view of the display panel taken along line II-IF of FIG. 8. The embodiment in FIGS. 8 and 9 includes elements similar to those described in FIGS. 1 to 7B, and therefore a detailed description of the similar elements shall be omitted.

In the embodiment of FIG. 8, the display panel may include a plurality of storage lines. The plurality of storage lines may extend in the same direction as the gate lines and may be arranged in the extended direction of the data lines. In some particular embodiments, the storage lines may be omitted from some of the pixels.

FIG. 8 illustrates a partial view of a pixel including a storage line $SL_i$. The storage line $SL_i$ is disposed at a distance from the gate line $GL_i$ and is orthogonal to the data lines $DL_j$ and $DL_{j+1}$. Nevertheless, it should be noted that the storage line $SL_i$ is not limited to the configuration shown in FIG. 8. For example, the storage line $SL_i$ may be formed in various shapes and disposed at various positions on the display panel.

Referring to FIG. 8, each pixel includes a thin film transistor TFT and a pixel electrode PE. The pixel electrode PE overlaps with the storage line $SL_i$. Each pixel is connected to a corresponding gate line $GL_i$ and a corresponding data line $DL_j$.

As illustrated in FIGS. 8 and 9, the thin film transistor TFT includes a gate electrode GE, a source electrode SE, a drain electrode DE and a semiconductor layer AL. The gate electrode GE is connected to the gate line $GL_i$. The gate electrode GE is formed of the same material and layer structure as the gate line $GL_i$.

A gate insulating layer 10-1 is disposed on a first base substrate SUB1 covering the gate electrode GE, the gate line $GL_i$, and the storage line $SL_i$. The semiconductor layer AL is disposed on the gate insulating layer 10-1 overlapping the gate electrode GE. In some embodiments (not illustrated), an ohmic contact may be disposed on the gate insulating layer 10-1.

The drain electrode DE is connected to a corresponding data line $DL_j$. The drain electrode DE may be formed of the same material and layer structure as the data lines $DL_j$ and $DL_{j+1}$.

The source electrode SE is disposed on the gate insulating layer 10-1 spaced apart from the drain electrode DE. The source electrode SE and the drain electrode DE are formed overlapping with the respective end portions of the semiconductor layer AL.

A passivation layer 30 is disposed on the gate insulating layer 10-1 covering the source electrode SE, the drain electrode DE, and the data lines $DL_j$ and $DL_{j+1}$. In some embodiments, the passivation layer 30 may also serve as a planarization layer.

The pixel electrode PE is disposed on the passivation layer 30. The pixel electrode PE is connected to the drain electrode DE via a through hole CH3 formed in the gate insulating layer 10-1 and the passivation layer 30.

In some embodiments (not illustrated), a common electrode may be disposed on the pixel electrode PE, and a liquid crystal layer may be sealed between the common electrode and the pixel electrode PE. The common electrode may be disposed facing the pixel electrode PE.

In some embodiments, the display apparatus may further include a plurality of common lines, and the common electrode may be connected to the common lines. The common electrode may form an electric field with the pixel electrode, so as to drive the molecules in the liquid crystal layer.

The passivation layer 30 includes a plurality of dielectric layers. The plurality of dielectric layers include the first dielectric layer 30-F and the second dielectric layer 30-P.

The first dielectric layer 30-F includes a ferroelectric material. The ferroelectric material has spontaneous polarity (i.e., its polarization is inverted by an applied electric field). Due to the spontaneous polarity, ionic polarization occurs within the crystals in the ferroelectric material. As a result of the ionic polarization, the ferroelectric material may exhibit polarity even in the absence of an external electric field. Generally, the ferroelectric material has high dielectric constant.

The ferroelectric material may include an inorganic ferroelectric material and/or an organic ferroelectric material. The inorganic ferroelectric material may include a ferroelectric oxide material, a ferroelectric fluoride material, or a ferroelectric dielectric semiconductor. The organic ferroelectric material may include a polymer ferroelectric material.

In some embodiments, the first dielectric layer 30-F may include at least one of the following materials: polyvinylidene fluoride (PVDF), poly(vinylidene fluoride-trifluoroethylene) (P(VDF-TrFE)), MXD6 nylon, PZT (Pb(Zr, Ti)O$_3$), SBT (SrBi$_2$Ta$_2$O$_9$), BLT ((Bi$_x$, La$_{1-x}$)$_4$Ti$_3$O$_{12}$), SBTN (SrBi$_2$(Ta, Nb)O$_9$), and BST (Ba$_x$Sr$_{(1-x)}$TiO$_3$). The first dielectric layer 30-F may be formed as a single layer or a multi-layer stacked structure.

The second dielectric layer 30-P includes a paraelectric material. The second dielectric layer 30-P generally includes an insulating material. The second dielectric layer 30-P includes, but is not limited to, a material having a lower dielectric constant than the first dielectric layer 30-F. In some embodiments, the second dielectric layer 30-P may include at least one of the following materials: polyvinyl cinnamate, polyvinyl phenol, polyvinyl alcohol, polyimide, silicon oxide, and silicon nitride.

In some embodiments, an electric field may be formed between the pixel electrode PE and the storage line $SL_i$. In those embodiments, a capacitor may be formed, wherein the capacitor includes the pixel electrode PE as a first electrode, the storage line $SL_i$ as a second electrode, and the passivation layer 30 as a dielectric layer. The electric field formed between the pixel electrode PE and the storage line $SL_i$ can be used to control the driving voltage for changing the alignment of the molecules in the liquid crystal layer.

The first dielectric layer 30-F has remnant polarization properties. As described previously, the second dielectric layer 30-P may reduce or remove the remnant polarization properties of the first dielectric layer 30-F. Thus, the passivation layer 30 (comprising the stacked structure of the first dielectric layer 30-F and the second dielectric layer 30-P) may form a capacitor dielectric layer having improved dielectric properties and reduced remnant polarization.

It should be noted that the stacking order of the first dielectric layer 30-F and the second dielectric layer 30-P in the embodiment of FIGS. 8 and 9 may be modified in different ways. For example, in some embodiments, the first dielectric layer 30-F may be disposed under the second dielectric layer 30-P. In some embodiments, the passivation layer 30 may further include a third dielectric layer (not illustrated). The third dielectric layer includes the paraelectric material. In those embodiments, the first dielectric layer 30-F may be disposed between the second dielectric layer 30-P and the third dielectric layer.

In the embodiment of FIG. 9, the first dielectric layer 30-F and the second dielectric layer 30-P are depicted as having similar thicknesses. Nevertheless, it should be noted that the thicknesses of the first dielectric layer 30-F and the second dielectric layer 30-P may be different. For example, in some embodiments, the thickness of the second dielectric layer 30-P may be less than the thickness of the first dielectric layer 30-F. Since the second dielectric layer 30-P is connected in series with the first dielectric layer 30-F, the capacitance of the stacked layer may decrease as the thickness of the second dielectric layer 30-P increases. Accordingly, the second dielectric layer 30-P may be formed as a thin film, so as to reduce the remnant polarization properties of the first dielectric layer 30-F while maintaining the high dielectric constant of the first dielectric layer 30-F.

According to the above-described embodiments of the inventive concept, a ferroelectric material having reduced remnant polarization properties and high dielectric constant may be used as a driving capacitor. Thus, a display apparatus having improved driving properties may be achieved through the use of a stacked structure comprising the ferroelectric material, which may negate the need to include expensive high-k dielectric materials (that are typically difficult to process). It is further noted that the exemplary capacitor structure may also be used as a storage capacitor in the display apparatus.

While one or more embodiments of the inventive concept have been described with reference to the figures, it will be understood by those of ordinary skill in the art that various changes may be made to the different embodiments without departing from the spirit and scope of the present disclosure.

What is claimed is:

1. A display panel, comprising:
   a plurality of signal lines and a plurality of pixels disposed on a first substrate, wherein each pixel of the plurality of pixels is connected to a corresponding signal line of the plurality of signal lines, and each pixel comprises:
   a first electrode and a second electrode configured to form an electric field with the first electrode, wherein the first electrode overlaps with the second electrode in a plan view; and
   a stacked layer disposed between the first electrode and the second electrode;
   wherein the stacked layer comprises a first dielectric layer and a second dielectric layer, and the first electrode, the second electrode, and the stacked layer form a capacitor,
   wherein the first dielectric layer includes a ferroelectric material,
   wherein the second dielectric layer includes a paraelectric material.

2. The display panel of claim 1, wherein the first dielectric layer comprises at least one of polyvinylidene fluoride, poly(vinylidene fluoride-trifluoroethylene), MXD6 nylon, Pb(Zr, Ti)O$_3$, SrBi$_2$Ta$_2$O$_9$, (Bi$_x$, La$_{1-x}$)$_4$Ti$_3$O$_{12}$, SrBi$_2$(Ta, Nb)O$_9$, and Ba$_x$Sr$_{(1-x)}$TiO$_3$.

3. The display panel of claim 2, wherein the second dielectric layer includes a material having a lower dielectric constant than the first dielectric layer.

4. The display panel of claim 3, wherein the second dielectric layer includes at least one of polyvinyl cinnamate, polyvinyl phenol, polyvinyl alcohol, polyimide, silicon oxide, and silicon nitride.

5. The display panel of claim 1, wherein the second dielectric layer is directly disposed on one side of the first dielectric layer.

6. A display panel, comprising:
   a plurality of signal lines and a plurality of pixels disposed on a first substrate, wherein each pixel is connected to a corresponding signal line, and each pixel comprises:
   a first electrode and a second electrode configured to form an electric field with the first electrode;
   a first dielectric layer disposed between the first electrode and the second electrode, the first dielectric layer including a ferroelectric material;
   a second dielectric layer disposed between the first electrode and the second electrode, the second dielectric layer including a paraelectric material; and
   a third dielectric layer disposed between the first electrode and the second electrode, the third dielectric layer including the paraelectric material,
   wherein the first dielectric layer is disposed between the second dielectric layer and the third dielectric layer.

7. The display panel of claim 1, wherein the first dielectric layer has a lower thickness than the second dielectric layer.

8. The display panel of claim 1, further comprising:
   a second substrate disposed on the first substrate; and
   a liquid crystal layer disposed between the first substrate and the second substrate.

9. The display panel of claim 1, wherein the second electrode comprises a plurality of slits.

10. The display panel of claim 9, wherein the signal lines include:
    a plurality of gate lines extending in a first direction and arranged in a second direction crossing the first direction; and
    a plurality of data lines crossing the plurality of gate lines and insulated from the gate lines,
    wherein each pixel is connected to a corresponding gate line and a corresponding data line from among the plurality of gate lines and data lines.

11. The display panel of claim 10, further comprising a common electrode line disposed on the first substrate and insulated from the signal lines, wherein the second electrode is connected to the common electrode line.

12. The display panel of claim 1, wherein the second dielectric layer fully contacts one side of the first dielectric layer without any electrode disposed therebetween.

13. The display panel of claim 6, wherein the first dielectric layer contacts the second dielectric layer and the third dielectric layer.

* * * * *